United States Patent [19]

Jeffers

[11] Patent Number: 4,633,344
[45] Date of Patent: Dec. 30, 1986

[54] UNAMBIGUOUSLY TRACKING A DATA TRACK IN RESPONSE TO SIGNALS DERIVED FROM THE TRACK DATA ITSELF

[75] Inventor: Frederick J. Jeffers, Escondido, Calif.

[73] Assignee: Eastman Kodak Company, Rochester, N.Y.

[21] Appl. No.: 737,985

[22] Filed: May 28, 1985

[51] Int. Cl.$^4$ ................................................ G11B 5/56
[52] U.S. Cl. ........................................................ 360/77
[58] Field of Search .......................................... 360/77

[56] References Cited

U.S. PATENT DOCUMENTS

| | | | |
|---|---|---|---|
| 3,246,307 | 4/1966 | Stanley | 360/77 |
| 3,918,091 | 11/1975 | Walraven et al. | 360/77 |
| 4,055,849 | 10/1977 | Hickok | 360/77 |
| 4,164,781 | 8/1979 | Brown | 360/77 |

FOREIGN PATENT DOCUMENTS 2627002  1/1977  Fed. Rep. of Germany ........ 360/77

OTHER PUBLICATIONS

IBM Technical Disclosure Bulletin, vol. 19, No. 8, Jan. 1977, pp. 3228–3229, Data-Track-Following, Servo System, D. Martin.
IBM Technical Disclosure Bulletin, vol. 19, No. 9, Feb. 1977, pp. 3575–3576, AGC System for Dual-Element Magnetic Head Servo System, Granata et al.
IBM Technical Disclosure Bulletin, vol. 19, No. 11, Apr. 1977, pp. 4226–4227, On-Track-Data Servoing, Schneider et al.
IBM Technical Disclosure Bulletin, vol. 16, No. 6, Nov. 1973, pp. 1821–1823, Comstock et al., Triple-Layer Magnetic Recording Track Following Servo Concept with Alternating Single-Frequency Servo Tracks.

Primary Examiner—George G. Stellar

[57] ABSTRACT

To avoid ambiguity in the tracking of a magnetic head to a data track, the invention calls for the selection of a single given signal polarity, as recorded, as the source of positional control for a tracking servo. Difference and sum signals associated with the two longitudinal halves of a data track constitute, respectively, the servo error signal and the data signal.

10 Claims, 5 Drawing Figures

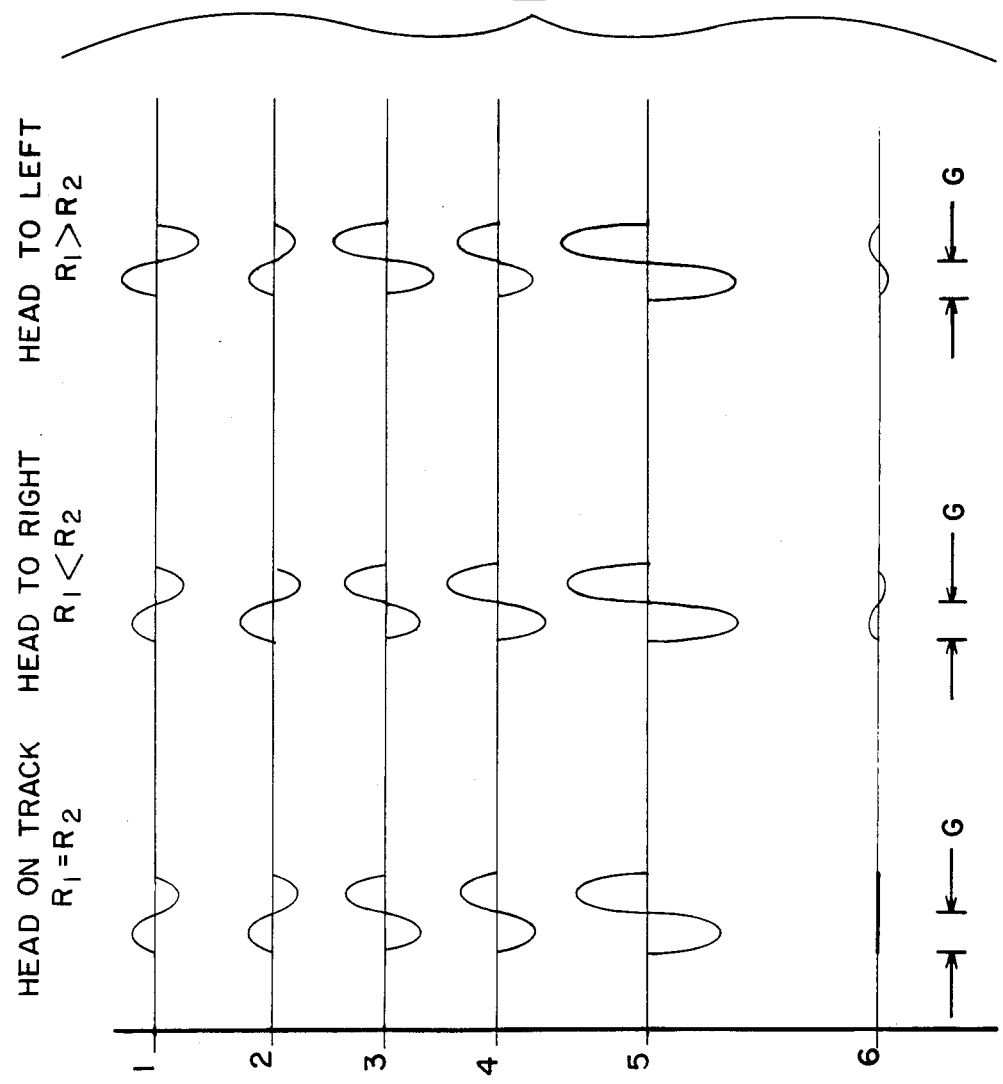

UNAMBIGUOUSLY TRACKING A DATA TRACK IN RESPONSE TO SIGNALS DERIVED FROM THE TRACK DATA ITSELF

BACKGROUND OF THE INVENTION

1. Field of the Invention

This invention relates in general to magnetic recording and more particularly to improved apparatus for providing tracking control during the playback of recorded signal information.

2. Description Relative to the Prior Art

There is a trend toward the packing of greater and greater amounts of data on magnetic storage devices such as floppy magnetic discs and magnetic tape. Implicit in such trend is the requirement that data tracks on such recording devices be narrower and narrower, and more closely packed together. In the recently announced 3.3 magabyte floppy disc, for example, the recording tracks thereof are 0.0047" wide, and on a 0.0052" pitch (guardband between tracks of 0.0005"). Similarly, with a high-track-density multitrack magnetic head, say of a type that provides 400 tracks per inch, tracks would be 0.0020", given guardbands of 0.0005". It is clearly of concern, therefore, that during playback of recorded information, the information so recovered be from the correct track, and not from a neighboring one.

It is known in the art to record tracking control signals in a magnetic recording medium as a means for preventing head-to-medium wander during playback of information recorded in the medium. Representative prior art in this connection may be found in U.S. Pat. No. 3,474,432 which depicts the use of various prerecorded frequencies in respective tracks, the signals being mixed in such a way as to cause head position error signals to be generated in response to head-to-medium wander. Similarly, more recently issued U.S. Pat. No. 4,258,398 calls for the use of paired prerecorded tracks as signal-sources for head orienting/positioning in connection with a multitrack configuration.

Other and varied tracking control techniques have been demonstrated and taught in the art. Such techniques are, however, universally wasteful of medium (relatively wide tracking-control tracks), exhibit less than optimally tight-control and are wanting when it comes to the matter of sensitivity.

Typical of such tracking control techniques is that disclosed in IEEE Transactions on Magnetics, Volume Mag.-17, No. 6, November 1981, page 2739 "A 2000 track/inch disk file servo system using a magneto-resistive head", by R. L. Comstock, C. C. Lin and G. E. Mauersberger. Such disclosure indicates the use of a split magneto-resistive structure for tracking a dedicated control track, whereby the control track signal as sensed by one or the other of the two halves of the split magneto-resistive structure is determinative of the direction of requisite tracking movement.

SUMMARY OF THE INVENTION

Contrary to the prior art use of a split magneto-resistive element in association with a dedicated tracking control track, the invention uses recorded data itself for tracking control purposes, albeit that . . . absent the invention . . . such data would be productive of "ambiguity" as to the direction of corrective head positioning. The source of the ambiguity problem, as well as the inventive solution to such problem, will be appreciated by reference to the figures, of which FIG. 1 is a schematic diagram, including a perspective view of a split magneto-resistive head useful in producing data from, as well as control to, a data track, FIGS. 2a, b, c, and 3a, b, c are diagrams useful in describing a problem solved by means of the invention, FIG. 4 is a schematic diagram useful in describing the operation of apparatus embodying the invention, and FIG. 5 illustrates various waveform diagrams useful in explaining the operation of the apparatus of FIG. 4.

DETAILED DESCRIPTION

Figure 1:
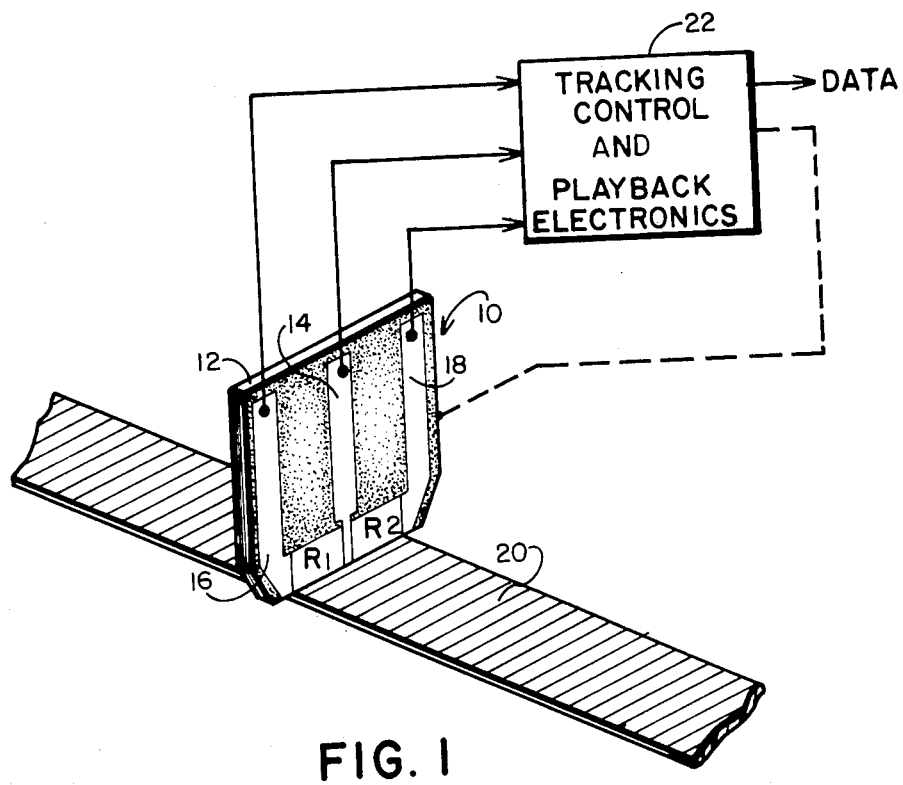

Referring to FIG. 1, a split magneto-resistive head 10, having a non-magnetic support 12, has first and second thin-film magneto-resistive elements $R_1$, $R_2$ electrically connected in series, the interconnection between the elements $R_1$, $R_2$ having a lead 14 connected to it. Leads 16, 18, respectively, connect to the magneto-resistive elements $R_1$, $R_2$. (The term "R", with an appropriate subscript, designates the resistance of the corresponding magneto-resistive element.) The magneto-resistive head 10 is adapted to ride along a magnetic recording track 20 containing data signals and, in response to the fields associated with such signals, supplies playback signals to tracking control and playback electronics 22. The tracking control and playback electronics 22, in addition to processing the playback signals for the recovery of recorded data, provide unambiguous positional tracking of the head 10 to the track 20 in a manner to be described below. The magneto-resistive elements $R_1$, $R_2$, while in operation, have magnetizations which are canted with respect to serial current flow through the elements $R_1$, $R_2$. Quiescent canting of the $R_1$, $R_2$ magnetizations may be provided by ancillary biasing means or by virtue of a film-forming deposition procedure, both of which are known to the art. When their magnetizations are similarly canted, the resistances of the magneto-resistive elements $R_1$, $R_2$ are equal.

Before addressing the workings of the invention, the source of the aforementioned tracking control ambiguity will be addressed. Consider the schematic showing of the magneto-resistive elements $R_1$, $R_2$ as in FIG. 2a: A recorded signal in the track 20 generates a signal field with a polarity as reflected by the vector 24, the respective (quiescent) magnetizations 26, 28 of the equi-resistant magneto-resistive elements $R_1$, $R_2$ being canted, as depicted. In response to the field associated with the vector 24, the magnetizations 26, 28 increase their angles of cant (26', 28'), thereby causing the resistances of the elements $R_1$, $R_2$ to decrease equally, thus maintaining $$R_1 = R_2,$$

albeit that the quantity $R_1 + R_2$ decreases from that which obtains in the absence of the recorded signal (vector 24). Were the head 10 to have been off-track, as in FIG. 2b, the cant of the magnetization 26' would be unchanged from that of FIG. 2a; but the cant of the magnetization 28' would be less, thereby causing the resistance of the magneto-resistive element $R_2$ to be greater than that of the magneto-resistive element $R_1$. Thus, $R_1 < R_2$, which means that the polarized term $R_1 - R_2$ would be negative. Similarly, were the head 10 to have been off-track, as in FIG. 2c, the cant of the magnetization 28' would be unchanged from that of FIG. 2a; but the cant of the magnetization 26' would be less, thereby causing the resistance of the magneto-resistive element $R_2$ to be less than that of the element $R_1$. Thus, in FIG. 2c, $R_1 > R_2$, which means that the polarized term $R_1 - R_2$ would be positive.

Reference should now be had to FIGS. 3a, b, c. In response to a recorded signal the polarity of which is as depicted by the vector 24' (reversed with respect to that of the recorded signal of FIGS. 2a, b, c) a to-the-right, or a to-the-left, positioning of the head 10 from that of FIG. 3a causes the polarized $R_1 - R_2$ terms of FIGS. 3b, 3c to be reversed from that of FIGS. 2b, 2c. Such ambiguity is at the root of the problem addressed by the invention:

Given the potential for such ambiguity, the invention calls for the selection of one or the other (but not both) of the signal polarities—as recorded—in the track 20 as the source of positional control for the head 10. That is, provided there is appropriate pre-selection of the recorded signal polarity, the difference signal associated with $R_1 - R_2$ may be used for tracking control and, coincidentally, the sum signal associated with $R_1 + R_2$ will constitute the data signal that is recorded in the track 20. Working of apparatus pursuant to this provision will now be described with reference to FIGS. 4 and 5, the points 1–6 of FIG. 4 being appropriately identified in FIG. 5:

A constant current source 30 applies a dc sense current to the magneto-resistive head 10 via leads 16, 18. So long as the resistances of the magneto-resistive elements $R_1$, $R_2$ are equal, the $\Delta e_1$, $\Delta e_2$ voltages developed across them are equal. Given that the head 10 is on track—and, for sake of discussion, assuming the track signal is an alternating signal of some reproducible frequency—equal signals (points 1, 2) are applied to the base-emitter circuits of transistors 32, 34. After respective phase-reversals (points 3, 4), the signals are applied to respective summing and difference circuits 36, 38. Attendantly, the summing circuit 36 produces (point 5) a substantial data signal $\Delta e_1 + \Delta e_2$; and the difference circuit 38 produces a zero output signal because $\Delta e_1 - \Delta e_2 = 0$.

Figure 2:
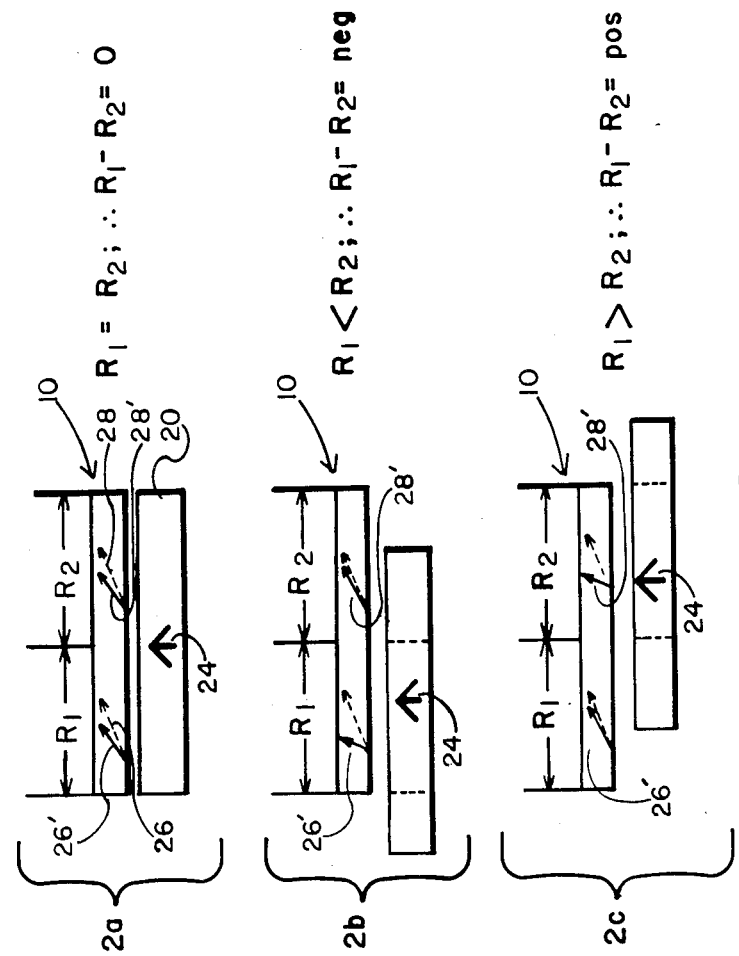

In this embodiment of the invention, the schematic depiction of FIG. 2 (and not of FIG. 3) is referenced for purposes of producing an unambiguous tracking control: As the head 10 moves to the right as in FIG. 2b, the signal voltage developed across the magneto-resistive element $R_2$ (point 2) increases, while that which is developed across the magneto-resistive element $R_1$ (point 1) remains the same. After appropriate amplifications and phase reversals (points 3, 4), a substantial data signal is produced (point 5); and an error signal ($\Delta e_1 - \Delta e_2 \neq 0$) corresponding in amplitude and phase to the "rightward" mistracking of the head 10 is also provided (point 6). To assure against tracking control ambiguity, the invention works to gate control only during that duration "G" when the recorded signal, as sensed by the head 10, has the polarity that corresponds to the vector 24 of FIGS. 2a, b, c. Such a gate duration G occurs when the sum signal (at point 5) swings negatively (diode 39). With a gate 40 closed during the negative swing of the sum signal (point 5), the difference signal (point 6) is applied to a phase-comparator 42, wherein the phase of the difference signal is compared to that of the sum signal. Given that the phases of its two input signals are opposite, the output of the phase-comparator 42 causes a servo 44 to return the head 10 to the left, as viewed in FIG. 2b.

Figure 4:
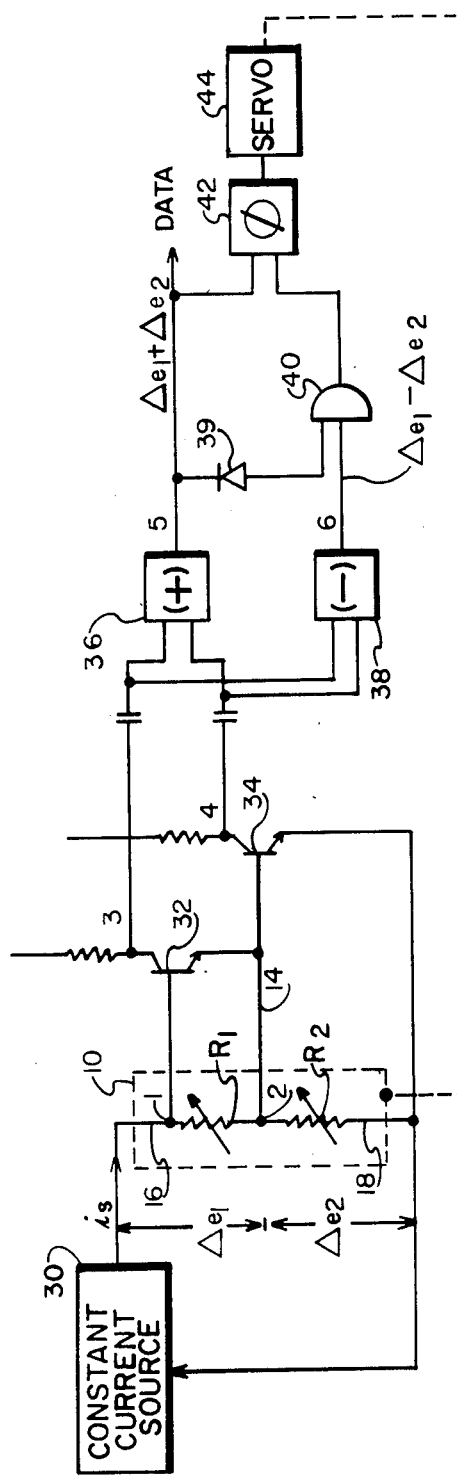

Were the head 10 to have mistracked to the left, causing the resistance of the magneto-resistive element $R_1$ to be greater than that of the element $R_2$, the phases of the data signal at point 5, and of the tracking control error signal at point 6, of FIG. 4, would be the same. Attendantly, the polarized output of the phase-comparator 42 would be such as to cause the servo 44 to return the head 10 correctively to the right, as viewed in FIG. 2c.

Figure 3:
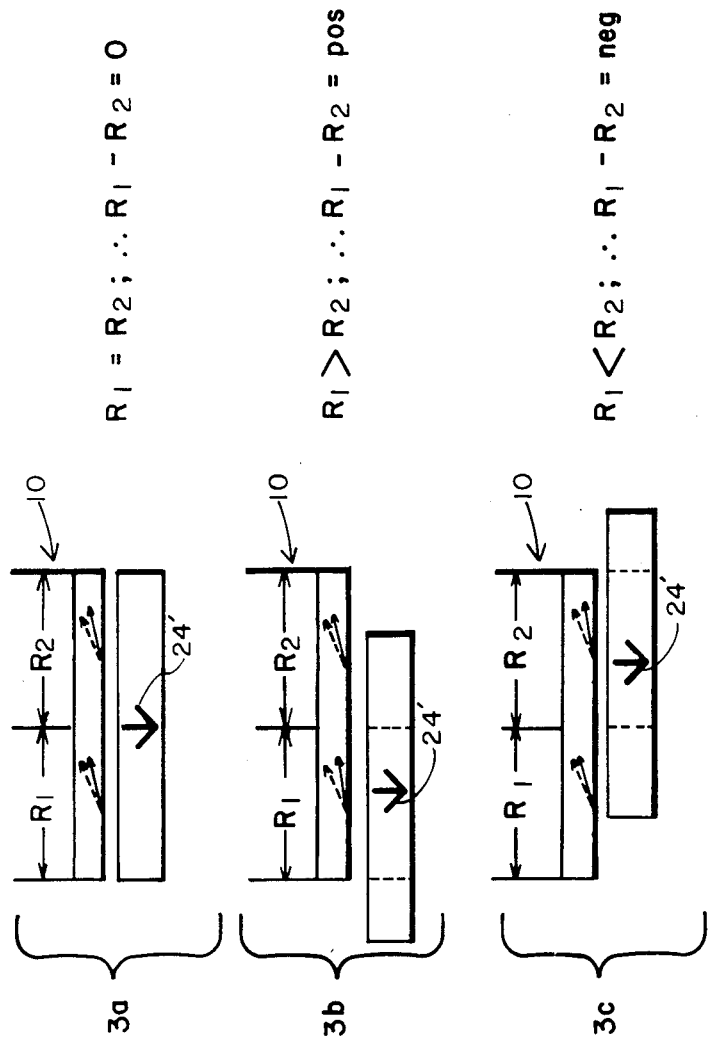

It will be appreciated that the same sort of unambiguous control may be afforded utilizing the referenced schematic depiction of FIG. 3 (i.e. control pursuant to the negative-going half cycle of recorded signal as represented by the vector 24'), provided that the operation of the diode 39/gate 40 is reversed, and the phased-control operation of the servo 44 is such that "like phases to the comparator 42" is productive of leftward positioning; and "unlike phases to the comparator 42" is productive of rightward positioning.

To recapitulate: the invention takes recognition of the fact that—when using a data-reading split magneto-resistive head which contemporaneously tracks recorded data in response to a difference signal produced by means of the "split" within the magneto-resistive head—only recorded signals of a pre-determined sense are useful in unambiguously providing such tracking. In this connection, then, the invention may be employed with such recordings as are employed, for example, with return-to-zero digital recording techniques.

The invention has been described in detail with particular reference to a presently preferred embodiment, but it will be understood that variations and modifications can be effected within the spirit and scope of the invention.

What is claimed is:

1. Magnetic recording playback apparatus comprising
   a. a field sensing magneto-resistive playback head having first and second serially connected magneto-resistive elements, said playback head being disposed for cooperative relationship with fields associated with signals recorded in a track of a magnetic recording medium,
   b. circuit means, with first and second input means, for producing a signal corresponding to the difference between signals applied to its two input means,
   c. servo means for providing relative positioning between said playback head and said recording medium track,
   d. means for applying to the first of said circuit means input means a signal corresponding to the signal field sensed by said first magneto-resistive element,
   e. means for applying to the second of said circuit means input means a signal corresponding to the signal field sensed by said second magneto-resistive element, and
   f. means for applying a signal corresponding to the output of said circuit means to said servo means when the signal field sensed by said playback head has, substantially, a single given predetermined polarity.
2. The apparatus of claim 1 wherein
   a. the signals recorded in said track are signals corresponding to data, and
   b. said apparatus further comprises means for algebraically summing signals which correspond to the signal fields sensed by said first and second magneto-resistive elements, the resultant sum signal of said algebraic summing means corresponding to said data.

3. The apparatus of claim 2 wherein said means for applying a signal corresponding to the output of said circuit means to said servo means comprises means for gating a signal, corresponding to the output of said circuit means, to said servo means in response to the occurrence in said track of said single given signal polarity.

4. The apparatus of claim 1 wherein said means for applying a signal corresponding to the output of said circuit means to said servo means comprises means for gating a signal, corresponding to the output of said circuit means, to said servo means in response to the occurrence in said track of said single given signal polarity.

5. Apparatus for use in the playback of magnetically recorded signals within a recording medium, said apparatus comprising
   a. first and second magneto-resistive elements, electrically connected in series, and together forming a playback magnetic head, said magneto-resistive elements being each a signal producing element that is responsive to said recorded signals,
   b. means cooperative with said magnetic head for producing a signal corresponding to the difference between the signals produced by said magneto-resistive elements,
   c. a servo, the output of which is connected to said magnetic head, for providing relative positioning between said magnetic head and said medium, and
   d. means responsive at the occurrence of a given polarity in the signals which are produced by said magneto-resistive elements for applying a signal corresponding to the output of said means for producing a difference signal to said servo, whereby said servo positions said magnetic head in relation to said medium to cancel said difference signal.

6. The apparatus of claim 5 wherein said magnetically recorded signals are data signals, and wherein said apparatus further comprises means cooperative with said magnetic head for producing a signal corresponding to the algebraic sum of the signals produced by said magneto-resistive elements, said sum signal constituting the data signal output of said apparatus.

7. The apparatus of claim 6 wherein said means responsive at the occurrence of given polarity comprises
   a. polarity sensitive means responsive to a signal, processed within said apparatus, which has a predetermined phase relationship to that of said sum signal, and
   b. gate means, cooperative with said polarity sensitive means, for applying to said servo the signal output of said means for applying a signal to said servo.

8. The apparatus of claim 5 wherein said means responsive at the occurrence of a given polarity comprises
   a. polarity sensitive means responsive to a signal, processed within said apparatus, which has a predetermined polarity relationship with respect to said recorded signals, and
   b. gate means, cooperative with said polarity sensitive means, for applying to said servo the signal output of said means for applying a signal to said servo.

9. For use in tracking data magnetically recorded in a recording track of a recording medium, said data being represented by a succession of magnetizations of one or another polarity within said medium, apparatus comprising
   a. means cooperative with said track for producing first and second signals corresponding to magnetizations therein, wherein one or the other of said signals is greater depending on the direction of mistracking of said means with respect to said track,
   b. a servo cooperative with said means for producing first and second signals for relatively positioning that means with respect to said track,
   c. means for providing a resultant signal corresponding to the difference between said first and second signals, and
   d. means for applying said resultant signal to said servo during times when said means cooperative with said track produces first and second signals having the same respective polarity, said polarity being substantially exclusively of a given predetermined sense.

10. The apparatus of claim 9 further comprising means for algebraically summing said first and second signals to form a data signal.

* * * * *